Patented Aug. 3, 1943

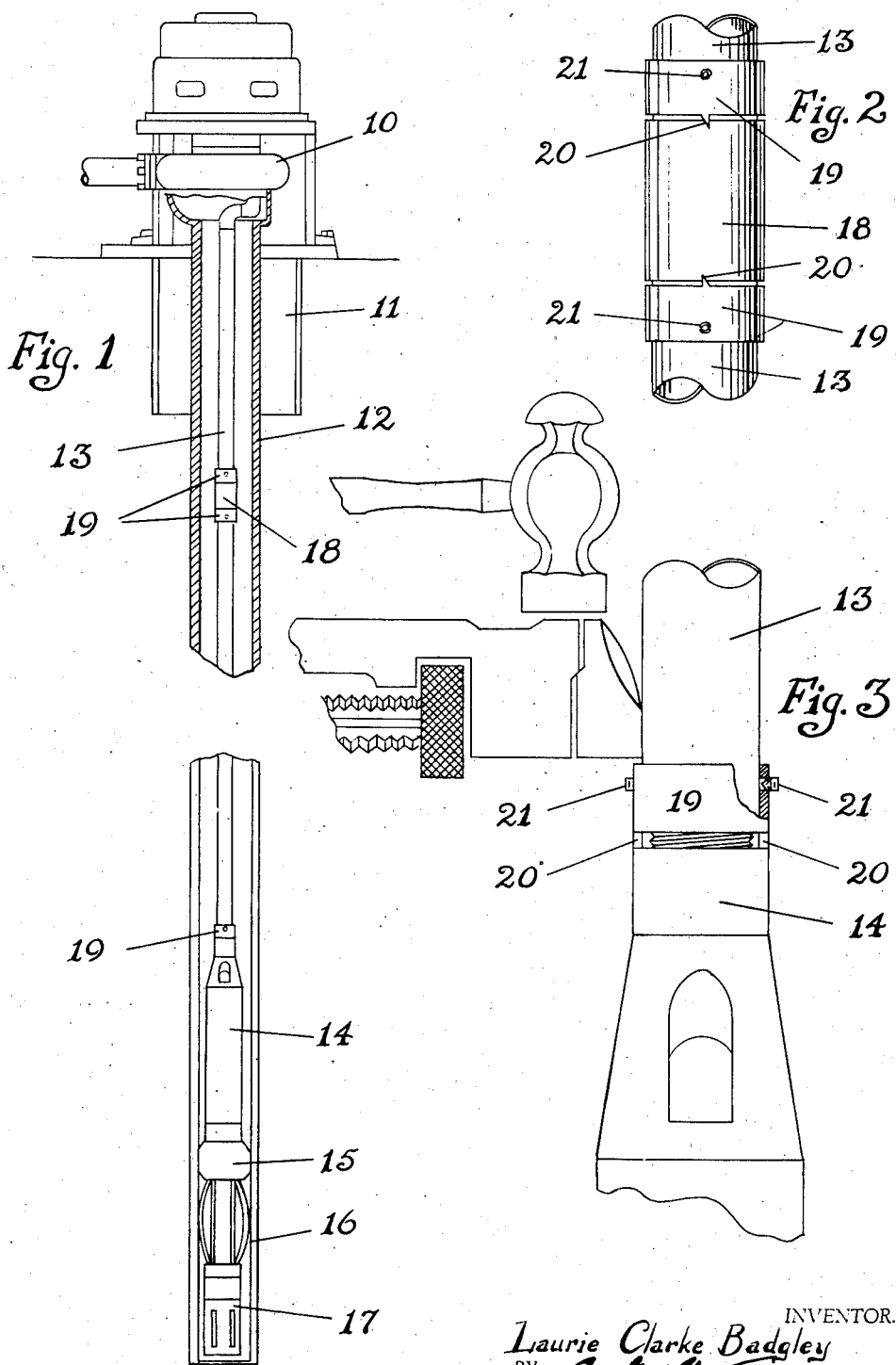

2,325,580

UNITED STATES PATENT OFFICE 2,325,580

PIPE LOCK AND THE LIKE

Laurie Clarke Badgley, Springfield, Ill.

Application September 11, 1941, Serial No. 410,451

5 Claims. (Cl. 285—146)

This invention has to do with the means of locking pipe sections, at their joints, against rotation with respect to each other, or with respect to other objects carried by said pipe sections.

It is an object of my invention to provide an improved locking means for use on pipes such as the pipes in an ejector type pump and the like, whereby the pipe sections can be rotated without becoming unthreaded when the pipe locking mechanism is in operation.

It is a further object of this invention to provide an improved pipe locking mechanism which is inexpensive, which is adaptable to use with ordinary pipes and pipe couplings on the market today, which can be conveniently installed by simple tools, and which provides a positive and powerful lock.

Other objects and advantages of the invention will appear as the nature of the improvements is better understood, the invention consisting substantially in the novel construction, combination and arrangement of parts hereinafter fully described, illustrated in the accompanying drawing, and finally pointed out in the appended claims.

In the drawing:

Figure 1 shows a vertical elevational view through a section of a well casing having a pump of the ejector type installed, showing the use of pipe locks constituting my present invention. The figure has a portion broken away to reduce it in size.

Figure 2 is a fragmentary elevational view showing pipe locks partially installed at the joinder of two pipe sections; and Figure 3 is a fragmentary elevational view of a pipe lock in position at the junction of a pipe and an ejector assembly, one means of forcing the pipe lock into position being indicated.

Referring more in detail to the construction shown in the various figures and particularly to Figure 1, I show the pipe lock mechanism as applied to an ejector type pump assembly. It is understood that it may be used in other installations but that an ejector pump installation is an illustrative use where the need for such a pipe lock is clearly apparent.

Figure 1 shows the pump assembly 10 installed, as in the average well using an ejector pump, over the pit 11 within the well casing 12 is inserted the ejector pipe 13, the ejector 14, the packer 15, the spring dog assembly 16, and the strainer and foot valve mechanism 17. The ejector pipe 13 consists as shown, of two or more sections which are joined by a coupling or couplings 18.

Installed on the ejector pipe 13 are the pipe locks 19 constituting the present invention. These pipe locks are shown in place on both sides of the coupling 18, and on the ejector 14.

Referring more to Figures 2 and 3, the detailed construction of the pipe lock is more clearly apparent. It comprises in its preferred embodiment, an annular ring which fits closely over the ejector pipe 13 and is preferably slipped into place before the two sections of the pipe are joined by the coupling 18. The pipe lock will ride loosely over the pipe sections 13 until the sections are threaded into the coupling 18, thus forming a tight joinder.

The pipe lock 19 has one or more teeth 20, preferably formed of a portion of the same material as the annular ring and in the same operation as the annular ring is formed. These teeth portions preferably comprise a projecting sharpened pointed portion adapted to lie alongside the pipe 13.

As shown particularly in Figure 3 the pipe lock is placed against the coupling or other objects into which the teeth are to be fastened, such as the ejector assembly 14 of Figure 3, and the teeth 20 are then driven or forced into the object such as the ejector assembly by any convenient means. One convenient means is to place a tool such as a wrench or a bar of metal, or other object, on the shoulder of the pipe lock and drive the pipe lock teeth into the object in which they are to be inserted, by blows from a hammer or the like. The teeth will thus be forced into the coupling or other object and will lock the pipe lock to such coupling so that the pipe lock is held against rotation with respect to the coupling.

The pipe lock is then provided with a convenient means holding it attached to the pipe 13. This comprises one or more set screws or the like 21. In Figure 3, a portion of the pipe lock 19 is broken away and the set screw 21 is shown as having the pointed end portion, which "bites" into the pipe 13 and holds the pipe lock 19 against rotation with respect to the pipe 13.

Preferably the said set screws 21 are threaded through an opening in said pipe lock and may be "set" firmly in place by a screw driver or other convenient means.

It will thus be seen that in order to assemble the construction shown in Figure 1, the pipe 13 normally consisting of several sections is joined by the coupling 18, then the pipe locks 19 are forced into position so that the teeth 20 dig into the coupling 18, after which the set screws 21 are seated firmly against the pipe 13. The sections of the pipe 13 are then held against rotation with respect to each other. The ejector 14 is screwed onto the pipe 13 after the pipe lock 19 is on said pipe 13. The pipe lock 19 is then forced down on the ejector 14, and the set screws 21 are seated. All parts of the whole assembly is thus held against rotation with respect to each other. This is particularly important in an ejector type pump wherein the packer 15 must be expanded by rotation of the assembly with respect to the spring dog 16.

The form of the invention herein shown and described presents a preferred embodiment thereof, and delineates its adaptation to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. A pipe lock comprising an annular ring adapted to fit over a pipe, at least one sharpened tooth extending from said pipe lock longitudinally with respect to pipe over which said pipe lock fits, and a set screw in said annular ring adapted to seat against the pipe over which said pipe lock fits.

2. A pipe lock adapted to lock a section of a pipe and a coupling, comprising an annular ring means adapted to be carried by said pipe section, with teeth means adapted to engage and be driven into said coupling, and a clamping means, such as a set screw, holding said pipe lock against movement with respect to said pipe section, said clamping means being releasable.

3. A pipe lock for locking a section of pipe to a device threaded on said pipe, said device having a diameter somewhat larger than said pipe whereby a ledge portion of said device extends diametrically outward circumferentially of said pipe, said pipe lock laterally fitting over said pipe and adapted to seat against said device at the ledge portion thereof, a tooth means on said pipe lock engaging said device at the ledge portion thereof, said tooth means extending from said locking means substantially longitudinally of said pipe, and said tooth means terminating in a point at its end and adapted to engage said device whereby a blow on said pipe lock drives said tooth means into the ledge portion of said device holding said pipe lock against rotation with respect to said device, and said pipe lock being provided with at least one set screw which is threaded through said pipe lock and seats against said pipe, holding said pipe lock against rotation with respect to said pipe, the said screw having a sharpened point which engages the pipe.

4. A pipe lock for locking a section of pipe to a device threaded on said pipe, said device having a diameter somewhat larger than said pipe whereby a ledge portion of said device extends diametrically outward circumferentially of said pipe, said pipe lock laterally fitting over said pipe and adapted to seat against said device at the ledge portion thereof, a tooth means on said pipe lock engaging said device at the ledge portion thereof, said tooth means extending from said locking means substantially longitudinally of said pipe, and said tooth means being adapted to engage said device, and said pipe lock being provided with a plurality of set screws which are threaded through said pipe lock and seat against said pipe, holding said pipe lock against rotation with respect to said pipe, the said screws having sharpened points which engage the pipe.

5. A pipe lock comprising a ring adapted to fit over a pipe, said ring having a sharpened tooth extending therefrom longitudinally with respect to the axis of the ring and being adapted to being forcibly driven into a member forming a shoulder on said pipe, and releasable means for positively securing said ring to said pipe.

LAURIE CLARKE BADGLEY.